United States Patent [19]

Pillot

[11] 4,366,979
[45] Jan. 4, 1983

[54] EXTENDIBLE STRUCTURE FORMING SHELTER ADAPTABLE ON THE ROOF OR TOP OF AN AUTOMOBILE VEHICLE

[75] Inventor: Bernard Pillot, Romans, France

[73] Assignee: Societe Anonyme: Fralch, Romans, France

[21] Appl. No.: 173,277

[22] Filed: Jul. 29, 1980

[30] Foreign Application Priority Data

Jul. 30, 1979 [FR] France .............................. 79 19920

[51] Int. Cl.³ .............................................. B60P 3/32
[52] U.S. Cl. ..................................... 296/160; 135/88; 135/111; 296/26; 296/165
[58] Field of Search ................. 296/159, 160, 165, 26, 296/27; 135/1 A, 3 A, 4 A

[56] References Cited

U.S. PATENT DOCUMENTS

| | | | |
|---|---|---|---|
| 2,811,725 | 11/1957 | Cence | 296/165 |
| 3,351,078 | 11/1967 | Kleiman | 135/1 A |
| 3,403,936 | 10/1968 | Young | 296/27 |
| 3,575,460 | 4/1971 | Kennedy | 296/23 |
| 3,785,693 | 1/1974 | Fulton | 296/160 |
| 3,924,889 | 12/1975 | Gogush | 296/26 |

FOREIGN PATENT DOCUMENTS

| | | | |
|---|---|---|---|
| 2158927 | 5/1973 | France | 296/26 |
| 2287358 | 10/1975 | France | 296/26 |
| 1289294 | 9/1972 | United Kingdom | 296/26 |
| 1411885 | 10/1975 | United Kingdom | 296/26 |

Primary Examiner—Joseph F. Peters, Jr.
Assistant Examiner—John A. Carroll
Attorney, Agent, or Firm—Eyre, Mann, Lucas & Just

[57] ABSTRACT

The present invention relates to an extendible structure forming shelter adaptable on the roof or top of an automobile vehicle, wherein the structure comprises a lower shell and an upper shell which are connected to each other by articulated assemblies each comprising two arms and a return member urging said arms into open position. The invention is more particularly applicable to camping/caravanning.

4 Claims, 6 Drawing Figures

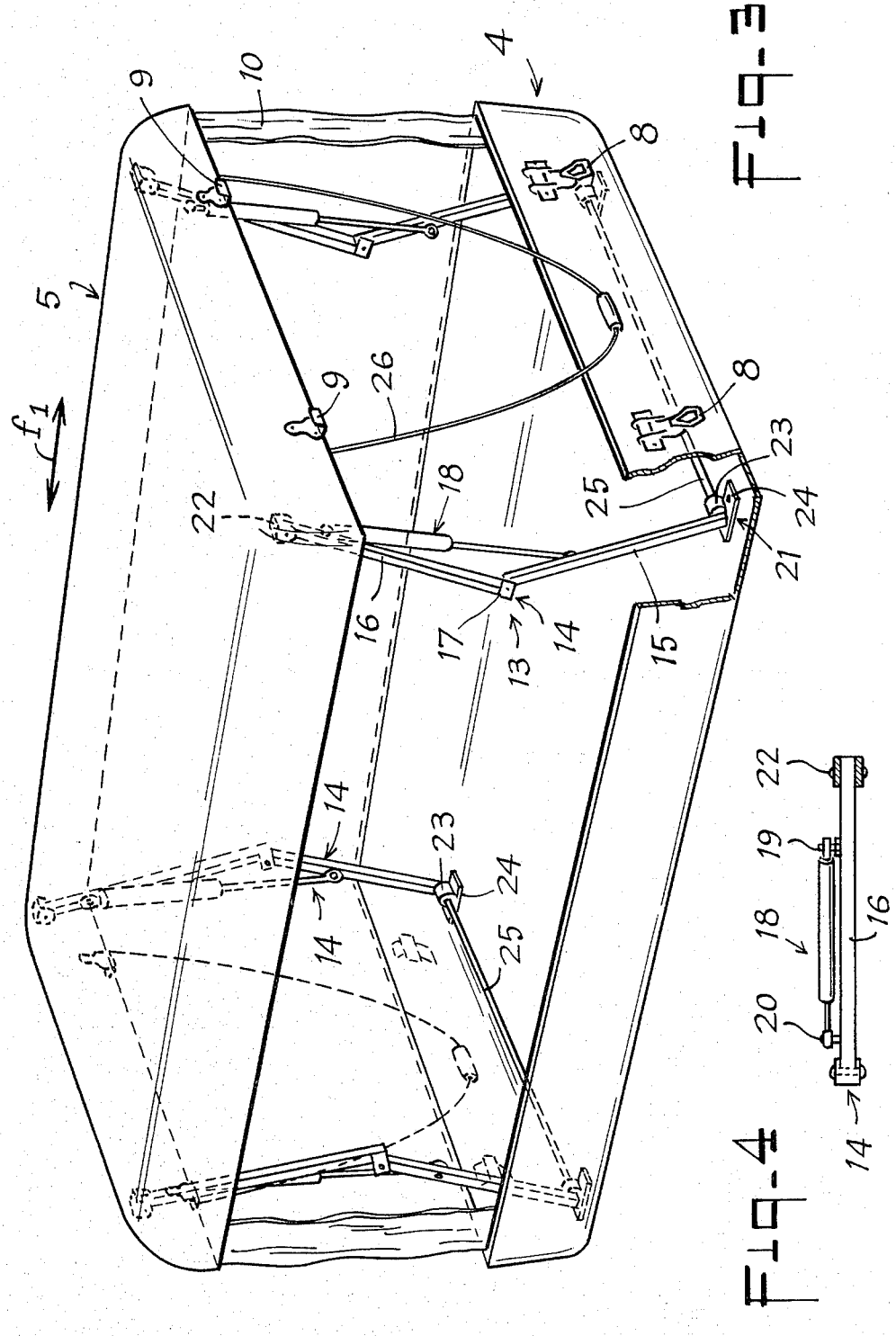

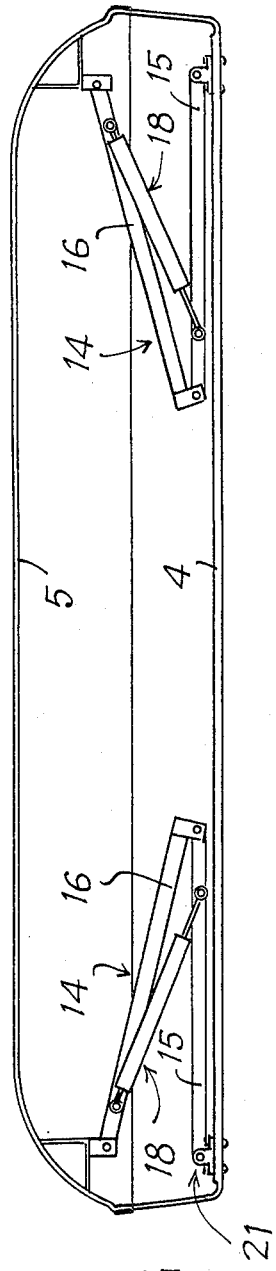
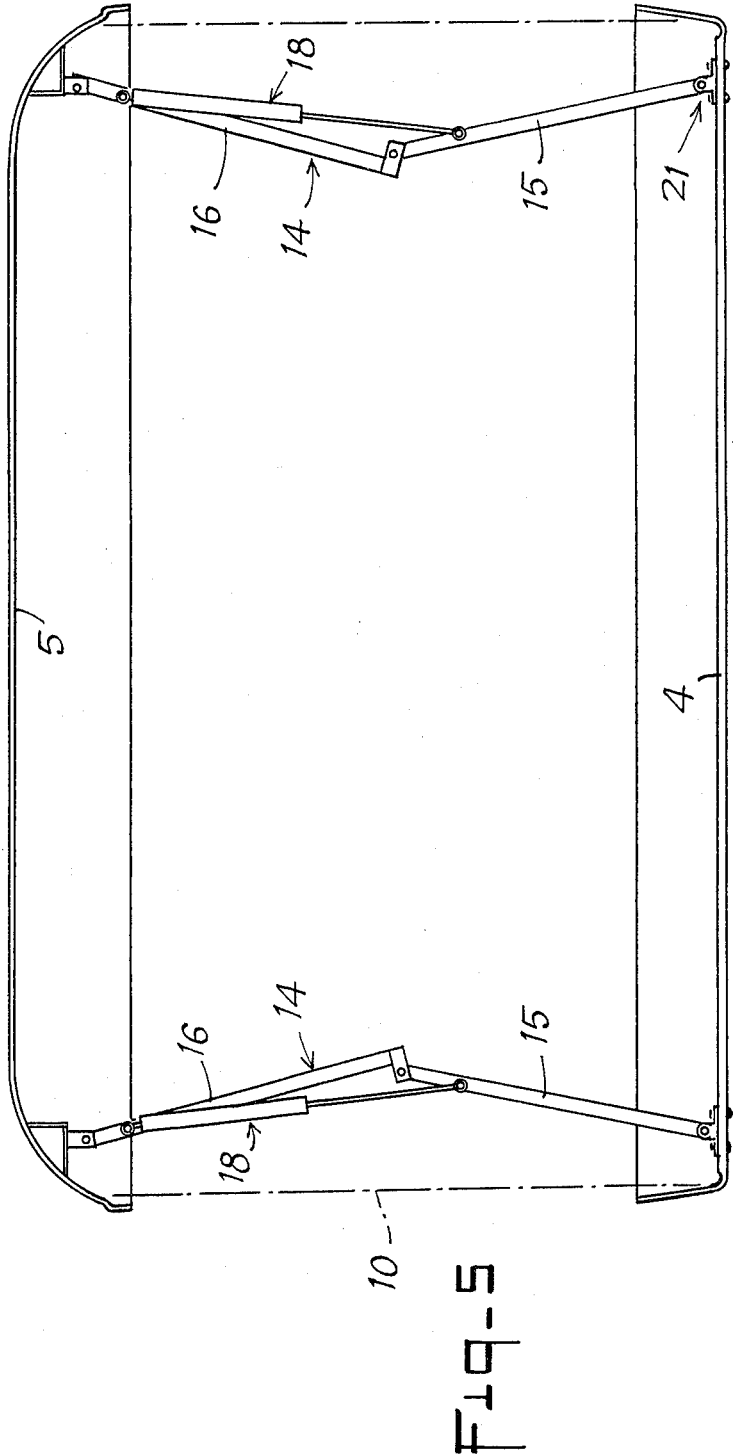

EXTENDIBLE STRUCTURE FORMING SHELTER ADAPTABLE ON THE ROOF OR TOP OF AN AUTOMOBILE VEHICLE

The present invention relates to extendible shelters and more particularly to shelters of the type which may be adapted on the roof or top of an automobile vehicle.

In this domain, extendible structures are known, adaptable on the roof or top of a vehicle on which they may occupy a so-called folded position in which they offer a minimum thickness allowing normal running of the vehicle in complete safety, or a so-called extended position in which they define a volume forming shelter which may be used for various purposes and particularly for sleeping accommodation for one or two persons.

The structures of the above type generally comprise a lower shell, most often rectangular in shape, which is provided with elements or members for fixing to a roof or top of a vehicle. The lower shell is associated with an upper shell which is complementary therewith, substantially of the same shape and, especially, having a periphery adaptable by its continuous edge on the opposite edge of the periphery of the lower shell. Connecting members are provided between the two shells to allow either the immobilisation of the latter in closed position, or the release of the upper shell with a view of the extension thereof. The structures of the above type are generally completed by a supple envelope connecting the two shells and adapted to form a peripheral wall defining the enclosure, volume or useful shelter when the upper shell occupies the high, extended position with respect to the lower shell. Openings are provided in this peripheral wall to represent on the one hand a door giving access to the interior and on the other hand windows for light and ventilation.

In the structures of the above type, the main problem to be solved is that of the means having to be used to allow, on the one hand, the upward extension in vertical elevation and, on the other hand, the downward folding in vertical displacement of the upper shell with respect to the lower shell and also to ensure that the upper shell is held in high position during the effective use of the volume or shelter.

Heretofore known means used to this end are constituted by two cross pieces articulated in scissor form, of which the general plane of each is provided to extend parallel to the axis of the structure parallel to the axis of running of the vehicle, i.e. parallel to the transverse sides of the shells when the latter are rectangular in form, the longitudinal sides of which extend parallel to the longitudinal plane of symmetry of the vehicle. Such scissors are sometimes associated with elastic compensators which cause the elevation of the upper shell when they restore the energy that they have stored.

Such a general solution does not give satisfaction for the following reasons:

The first drawback resides in the fact that the scissors do not offer a suitable mechanical resistance and do not enable a suitable stability to be given to the upper shell with respect to the lower shell. In addition, in the course of handling and use, these scissors are frequently permanently deformed, with the result that the return of the upper shell into closed position on the lower shell raises problems of complementary adaptation of the opposite peripheral edges.

Furthermore, such a mechanical solution does not present a sufficient safety factor in the case of untimely extension of the structure when the vehicle is moving. In fact, in such a case, the structure offers the relative wind a relatively large surface, with the result that the scissors are permanently deformed, to such an extent that the structure can no longer be returned to its closed position. Apart from the deterioration of the structure, it is also obvious that such a situation risks disturbing the road-holding and control of the moving vehicle.

Another drawback resides in the fact that the scissors occupy the transverse sides of the peripheral wall which are generally most often used for defining the openings for light and ventilation. To avoid the median point of articulation of these scissors being located at the centre of such panels, a constructional artifice is generally employed consisting in displacing the median point of articulation of the scissors upwardly or downwardly. Such a solution is, however, not acceptable since it reduces the mechanical resistance of the scissors further.

A further drawback resides in the fact that the scissors cover all the surface of the transverse sides in the course of the extending or lowering displacements of the upper shell, with the result that, at the moment of folding, there are frequently problems of catching and deterioration of the supple envelope. These risks of deterioration are more considerable as the scissors are associated with elastic members which must necessarily also be able to move parallel to the transverse sides.

In an attempt to remedy the above drawbacks, it has also been proposed to eliminate the elastic members and to associate each scissor element with a positive opening and closure control by providing assembly of the lower ends of the scissors on blocks or tapped nuts screwed on parts of opposite thread of a control shaft. To facilitate the manoeuvre, means for coupling the two threaded shafts have even been envisaged, with the result that, using one crank, it becomes possible to positively control the two threaded shafts to obtain either the elevation or the lowering of the upper shell in a plane parallel to the lower shell.

Although such a solution solves the problem of the existence of the springs, the scissors still have just as little mechanical resistance to a thrust directed parallel to the axis of advance and are still the frequent cause of catching and deterioration of the parts of the peripheral envelope forming the transverse sides.

In practice, it has proved that such a solution was not satisfactory either, as the existence of the means coupling the two threaded rods raises a problem of internal space and requires the construction of a protective sheath which reduces the useful volume in the lower shell. In the absence of such a protection, the coupling means, whatever its mechanical constitution, is then frequently the cause of catching and deterioration of the part of the peripheral envelope representing the corresponding longitudinal side.

It is an object of the present invention to eliminate the above drawbacks by proposing a novel extendible structure forming shelter and, in particular, novel means for controlling the relative displacement of the upper shell with respect to the lower shell, said means being especially designed to solve the general problem raised by such structures.

In accordance with the invention, the extendible structure forming shelter adaptable on the roof or top of a vehicle is characterised in that it comprises means for controlling the relative displacement of the upper shell with respect to the lower shell, these means employing;

four articulated assemblies each comprising two arms articulated on each other and on the shells and connected by a return member urging said arms into open position, the positioning of these assemblies so that each extends parallel to the axis of the structure placed parallel to the axis of advance in a rectilinear line of the vehicle, at least two pulling members fixed to the base of the upper shell and serving to return the latter into position of closure on the lower shell.

The object of the invention is more particularly designed to employ control means which occupy the least space possible and use for their development as small a surface as possible, with the result that most of the peripheral envelope may be used for defining windows for light and ventilation and/or doors.

A further object of the invention is to give the structure, even in extended position, a very high resistance and, particularly, a stability and holding of the upper shell plumb with the lower shell in order to eliminate the risks of deterioration either during use or when, by untimely opening, the upper shell extends when the vehicle is moving.

Another object of the invention is to provide control means which eliminate the relative longitudinal displacement of the upper shell with respect to the lower shell, particularly in the position of maximum elevation, and which thus make it possible, when the upper shell is lowered into closed position, to suitably adapt the complementary peripheral edges of the lower and upper shells.

It is a further object of the invention to ensure that the control means used may be easily surrounded and protected relatively, so as to represent assemblies of small volume whose articulated elements are separated from the peripheral envelope in order to protect the latter.

Yet another object of the invention is to ensure that the control means make it possible to extend and close the upper shell easily with respect to the lower shell, without obliging the user to effect long, complicated or difficult manoeuvres.

The invention will be more readily understood on reading the following description with reference to the accompanying drawings, in which:

FIG. 3 is a perspective view, with parts torn away, showing the subject matter of the invention on a larger scale.

FIG. 4 is a plan view illustrating a constructive feature of one of the elements of the invention.

FIGS. 5 and 6 are side elevations showing the subject matter of the invention in two characteristic positions.

Figure 1:
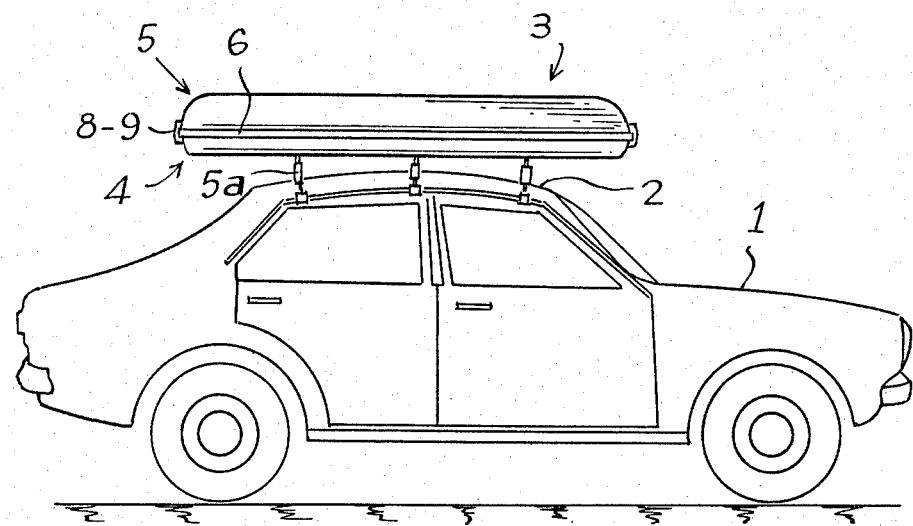
FIG. 1 is a schematic side elevation of an automobile vehicle, on the top of which is adapted the subject matter of the invention, in closed position.
Figure 2:
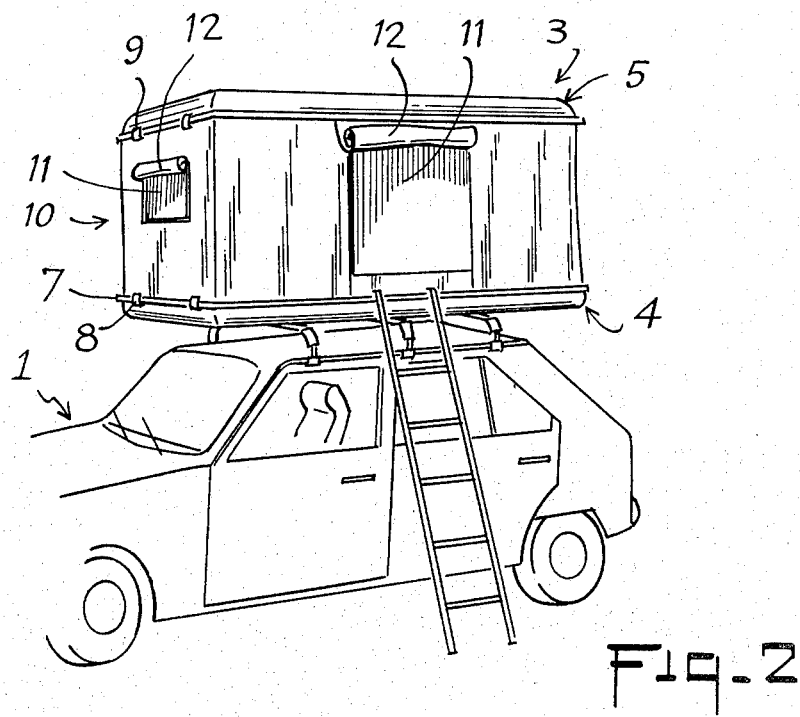
FIG. 2 is a perspective view showing the structure of the invention in extended position on the roof or top of a vehicle.

Referring now to the drawings, FIGS. 1 and 2 show an automobile vehicle 1, on the roof or top 2 of which is mounted an extendible structure according to the invention, generally designated by reference 3. FIG. 1 shows the extendible structure 3 in its closed position corresponding to the moving state of the vehicle and FIG. 2 illustrates this structure in its extended position, i.e. used as shelter when the vehicle is stationary.

In known manner, the extendible structure 3 comprises a lower shell 4 which is fixed on the roof or top 2 via fixing members 5a which it comprises. These fixing members do not directly form part of the invention and are constituted in known manner so as to fit for example on the drip mouldings on the top or beneath the fillisters of doors.

The extendible structure also comprises an upper shell 5 which is oriented towards or facing the lower shell 4. The upper shell comprises a peripheral edge 6 which is of shape complementary of the peripheral edge 7 of the lower shell 4 to allow a relative fit in the closed position as shown in FIG. 1. The shells 4 and 5 are provided on their periphery with complementary removable connecting members 8 and 9 which either maintain the shells 4 and 5 in the closed position as shown in FIG. 1, or, on the contrary, release the upper shell 5 with respect to the lower shell 4.

The two shells are generally constituted by moulded elements, preferably made of resin and glass fibres, and are generally in the form of a rectangle similar to a tray having a raised peripheral edge. Means are provided to associate these raised peripheral edges with a supple envelope 10, for example made of fabric, which defines the useful volume of the structure in the extended position, as illustrated in FIG. 2, and which is provided to be placed in the inner useful volume defined by the raised edges of the shells 4 and 5 when the latter are in closed position. The supple envelope 10 forms a peripheral wall in which openings 11 are defined, representing either windows for light and ventilation, or a door for access to the interior, and which may be closed by mobile flaps 12.

In accordance with the invention, the extendible structure illustrated in greater detail in FIG. 3 is completed by means 13 provided to control the relative upward or downward displacement of the upper shell 5 with respect to the lower shell 4 and to maintain said shell 5 in elevation with respect to the lower shell when the structure is used in its extended state as a shelter.

According to the invention, the means 13 are constituted by four assemblies 14 which each comprise, as shown in FIGS. 3 and 4, an element in the form of compasses, constituted by two arms 15 and 16 connected together by an articulation 17 joining the opposite ends. The articulated arms 15 and 16 may be made in several suitable ways and, in particular, be composed of tubular segments of circular or polygonal transverse section. The articulated arms 15 and 16 of each assembly 14 are connected together by a return member 18 designed to always urge said arms into relative open state. The return member 18 is disposed, according to a feature of the invention, to be located parallel to the common plane of the arms 15 and 16 on which it is adapted laterally by articulations 19 and 20. The return member is preferably constituted by a jack of the air type, but equivalent technical solutions may be envisaged and, in particular, it may be provided to fit a jack of the hydraulic type or a spring jack.

In these cases of construction, the body or cylinder of the jack is preferably mounted by articulation 19 on the arm 16, whilst the rod is connected to arm 15 by articulation 20.

The assemblies 14 are mounted so that the arms 15 are mounted by articulations 21 on the bottom of the lower shell 4, whilst the arms 16 are mounted by articulations 22 on the lower face of the upper shell 5. According to an arrangement of the invention, the assemblies 14 are also mounted so that the general plane of each assembly is located parallel to the longitudinal sides of the structure and, more particularly, parallel to the axis of the structure located parallel to the axis of running of the vehicle and more particularly parallel to the longitudinal sides. In addition, the fitting is effected near each angle defined with the corresponding contiguous side for the arms 15 and 16 to be further located parallel to the edges of the shells and the return members 18 to be, on the contrary, directed inwardly of the volume defined by the structure. In addition, the fitting is also preferably effected for the homologous assemblies 14 corresponding to the same longitudinal side of the structure to be opposite by their median articulation 17, i.e. each return member 18 is then directed opposite the transverse side when the structure adopts a general parallelepipedic configuration.

When the removable connecting members 8 and 9 are released, the four return members 18 act simultaneously and cause the progressive elevation of the upper shell 5 with respect to the lower shell 4. FIG. 6 shows that, in the closed position, the different assemblies are not totally folded, but are, on the contrary, placed in such a state that the articulated arms 15 and 16 form an acute angle. In this position, the action of the return members 18 may develop and cause the opening of the arms 15 and 16 and consequently the elevation of the upper shell up to the position illustrated in FIG. 5. In the course of this displacement, the peripheral wall or envelope 10 progressively unfolds and is stretched as illustrated in dashed and dotted lines in FIG. 5.

During this displacement, it is observed, by comparing FIGS. 5 and 6, that the articulated assemblies 14 cover a relatively small surface of extension located parallel to the longitudinal sides of the generally parallelepipedic structure, with the result that it may be provided to possibly make openings 11 forming windows or doors in the two longitudinal sides of the envelope 10. In addition, it is also observed, with reference to FIG. 3, that the transverse sides of such a structure are completely unrestricted, with the result that it is also possible to define in the corresponding parts of the envelope 10 openings 11 for light and ventilation.

Another particularly important advantage of the arrangement according to the invention resides in the fact that the effect of the initial orientation of the assemblies 14 is to place the return members 18 parallel to the longitudinal plane of the structure, but so that the homologous members 18 corresponding to the same side act in opposite directions. This ensures the stable maintaining of the upper shell 5 plumb with the lower shell 4, avoiding any risk of possibility of relative movement in one or the other of the directions of arrow $f_1$, i.e. parallel to the longitudinal plane of the structure. This constructional advantage is important as the structure has a particularly high mechanical strength in its extended position and may withstand stresses of use which, in the case of known conventional construction, result in deformation of the support means and disturb the simple, rapid and automatic fit of the opposite complementary edges of the shells 4 and 5. Another advantage of the same order resides in the fact that, in the case of untimely opening of the extendible structure whilst the vehicle is moving, the upper shell 5 and the peripheral envelope 10 are able to withstand the thrust of the relative wind. In fact, such a thrust tends to provoke the supplementary extension of the return members 18 which already occupy a position of maximum extension of the telescopic rods, which results in increased safety.

Another advantage of the constructive arrangement resides in the fact that the return members 18 are disposed laterally with respect to the plane of each arm 15 and 16, so that each assembly 14 has a greater resistance to buckling and torsional strength. This results in a better resistance of the upper shell 5 to the stresses exerted in a direction perpendicular to that of the arrow $f_1$.

A further advantage of this construction resides in the fact that the return members 18 are oriented inwardly of the defined volume, which greatly reduces the risks of the envelope 10 catching during a lowering phase when the upper shell 5 is closed on the lower shell 4.

Although this has not been shown, it should also be noted that each articulated assembly is in the form of a unitary member allowing the positioning of a sheath or protective sleeve, this further eliminating the risks of the envelope 10 catching when the upper shell 5 is lowered. According to another constructive arrangement of the invention, it is provided to make the lower articulations 21 of each assembly 14 in the form of a bearing 23 borne by a plate 24. The bearings 23 corresponding to assemblies 14 located parallel to a transverse side, in the case of the structure being in parallelepipedic form, are aligned so as to ensure the centering and support of a coupling bar 25 at the ends of which the corresponding arms 15 are fixed. This arrangement is provided so as to join the functions of opening of the assemblies 14 under the effect of the return members 18, so as to obtain a simultaneous opening of the arms 15 and 16 for each transverse side and consequently avoid any risk of buckling and twisting which might cause deterioration of one of the articulated assemblies.

26 designates at least one pulling member which is hooked on the upper shell 5, for example on each of the transverse sides and which the user pulls when he wishes to return the upper shell 5 into low position against the action of the return members 18 which, in the course of this phase of operation, store the energy which they will restore to control the automatic opening of said shell during an extension phase of the structure with a view to use thereof. To this end, the return members 18 are chosen so that their common action is able to provoke the automatic elevation of the upper shell and the extension of the peripheral wall.

What is claimed is:

1. In an extendible structure forming a shelter of the type adapted for a roof of an automobile vehicle comprising a lower shell having members thereon for fixation on the roof, an upper shell, a supple peripheral envelope connecting said lower shell and said upper shell, means for controlling the relative displacement of said upper shell with respect to said lower shell, said means for controlling including four articulated assemblies, each said articulated assembly comprising two arms articulated on each other and on the shells, said arms being connected by a return member urging said arms into open position, said assemblies being positioned so that each extends parallel to an axis of said extendible structure which axis is placed parallel with the line of advance of said automotive vehicle where said structure is attached thereto; said open position of said arms stretching said supple peripheral envelope between said lower and upper shells; said articulated assemblies being mounted so that the articulation of the assemblies located on the same side of said axis of the structure are opposed to one another; and said articulated assemblies disposed on opposite sides of said axis of the structure being coupled by a coupling bar whereby the arms of each said pair of articulated assemblies are constrained to open simultaneously.

2. The structure of claim 1 wherein said return member is a jack.

3. The structure of claim 2 wherein the jack is pivotally mounted by its cylinder and its rod is offset laterally with respect to the arms.

4. The structure of claim 2 wherein the jack comprises an air cylinder.

* * * * *